May 12, 1942.   A. D. SINDEN   2,282,534
CONVEYER
Filed March 9, 1939
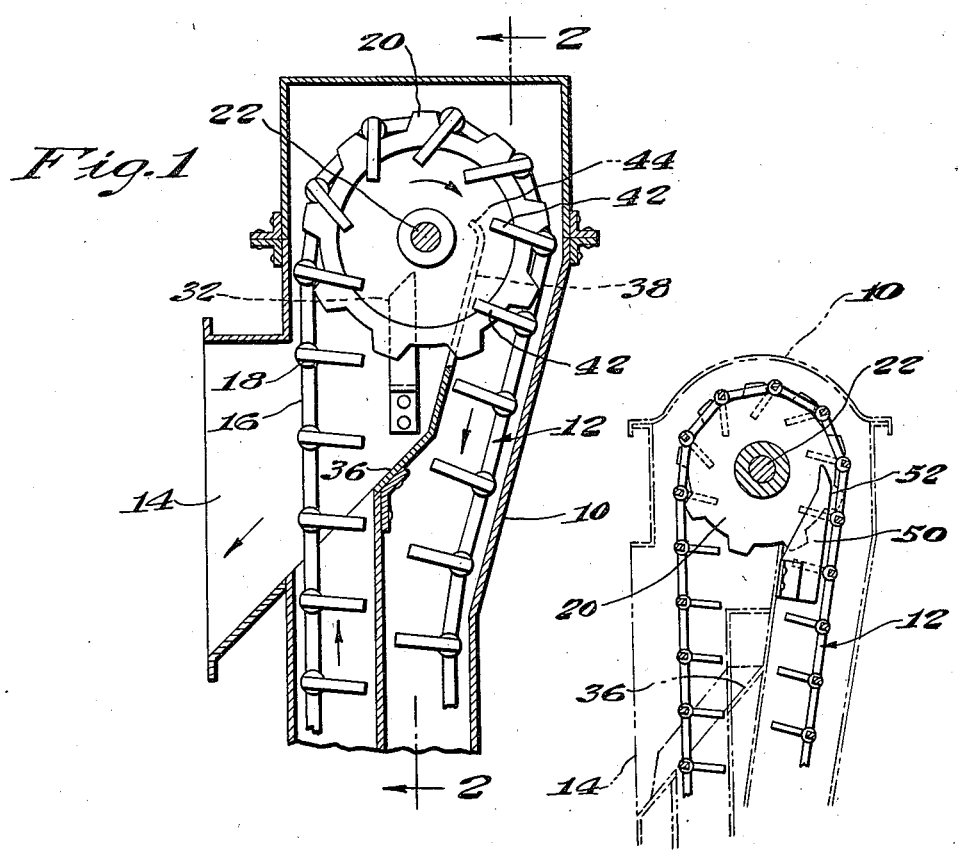
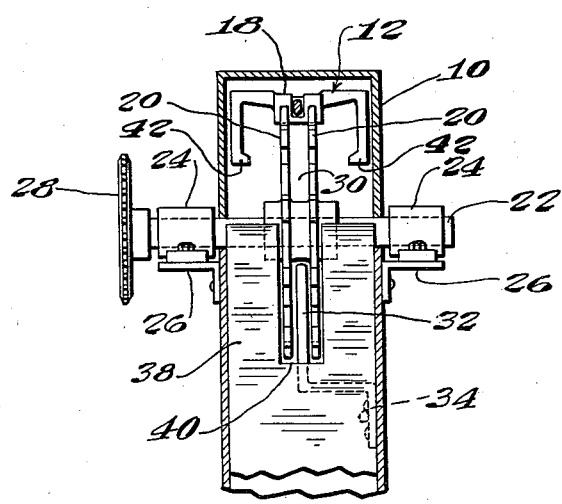
INVENTOR
Alfred Dela Sinden
BY J. Stanley Churchill
ATTORNEY Patented May 12, 1942

2,282,534

UNITED STATES PATENT OFFICE 2,282,534

CONVEYER

Alfred Delos Sinden, Aurora, Ill., assignor to Redler Conveyor Company, Quincy, Mass., a corporation of Massachusetts Application March 9, 1939, Serial No. 260,774

4 Claims. (Cl. 198—229)

This invention relates to a conveyer and more particularly to a conveyer for transporting flowable solid material in a stream.

The invention has for an object to provide a novel and improved construction of a conveyer of the character specified which is particularly adapted for the successful and efficient conveyance of those materials which have a tendency to adhere to the driving element.

With this general object in view, and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a vertical sectional view through the upper portion of a conveyer embodying the present invention; Fig. 2 is a sectional view on the line 2—2 of Fig. 1, and Figs. 3 and 4 are views similar to Figs. 1 and 2 illustrating a modified form of the invention, some of the parts being shown in dotted lines.

The present invention seeks to improve upon the present construction of a conveyer of the type known to the trade as a "Redler" conveyer comprising a casing provided with an inlet and an outlet and a conveying element having a plurality of transversely extended flights, arranged to be drawn through the casing to effect the conveyance therethrough of the solid flowable material in a stream. The conveying element may and preferably will be arranged to be drawn through the conveyer by driving means including one or more rotary elements over which the conveying element is caused to pass. Provision is made in the present conveyer for maintaining the rotary driving element free of any material which may have a tendency to adhere thereto whereby the possibility of jamming the conveyer which might cause an interruption in the operation thereof is reduced to a minimum. Provision is preferably made for automatically cleaning or scraping the material from the rotary element during the operation of the conveyer to provide in effect a self-cleaning rotary element particularly useful in a conveyer for the conveyance of hydrated and other sticky materials. Provision is also made for disengaging the conveying element from the rotary driving element at the normal point of disengagement thereof and to cause the conveying element to be guided into the return run of the conveyer, when conditions are such that the conveying element has a tendency to adhere to and follow the driving element beyond the normal point of disengagement.

In its preferred form the present invention is, in general, an improvement upon the "Redler" conveyer disclosed in the United States Reissue Patent No. 18,445, and, as herein shown, comprises a conveyer comprising a conduit 10 having a conveying element 12 associated therewith to be drawn therethrough to effect the conveyance of the material through the conduit. The conduit 10 may and preferably will be provided with the usual inlet (not shown) and outlet 14, all as set forth in said Redler reissue patent.

The illustrated conveyer is provided with a conveying element 12 made up of a plurality of individual units or flights of open structure constructed to be capable of being detachably and pivotally connected together and capable of effecting the conveyance of the material in a continuous mass or stream in accordance with the principles disclosed in the aforesaid Redler reissue patent. The conveying element 12 may comprise a plurality of individual and detachably connected flights each provided with a generally U-shaped transverse portion and a rigid tension member 16 having a hollow hub 18 at one end and having an enlargement at the other end capable of being received within the hollow hub of the succeeding flight to pivotally and detachably connect the flights together.

Referring now to the drawing, in the preferred embodiment of the invention, the conveying element is arranged to pass over double sprockets, the upper pair 20 of which is herein shown as mounted upon a cross shaft 22. The shaft 22 may be journaled in suitable bearings 24 supported upon angle plates 26 secured to the casing 10. The shaft 22 may be driven in any usual or preferred manner as by suitable connections to a driving sprocket 28. As herein illustrated, the hubs 18 of the flights are received between the teeth of the double sprocket 20. Experience with conveyers of the "Redler" type has demonstrated that when hydrated or sticky materials are being conveyed, some of the material has a tendency to adhere to the flights and in the operation of the conveyer, as the flights pass over the driving elements, the material is transferred onto the double sprocket 20 and after a period of time, subsequent deposits of material fill up the space 30 between the inner faces of the double sprocket 20 and between the teeth of the sprocket to an extent such as to interfere with the proper functioning of the conveyer. Furthermore, it has also been found that in some instances, the flights would have a tendency to adhere to the driving element and cause the latter to be carried around beyond the normal point of disengagement.

In accordance with one embodiment of the present invention, see Figs. 1 and 2, a cleaning finger 32 is provided to extend upwardly into the space 30 between the double sprocket 20. As herein shown, the cleaning finger is provided with an offset 34 which may be secured to the inside of the casing 10. In operation, the stationary finger effects the removal of any material which may tend to build up between the double sprocket 20 permitting the loosened material to drop by gravity onto the discharge plate 36 to be discharged from the outlet 14 during the operation of the conveyer.

In addition to the cleaning finger 32, a stripping plate 38 is preferably provided for the purpose of disengaging the conveying element 12 from the sprocket 20 at the normal point of disengagement. As shown in Figs. 1 and 2, the stripping plate may and preferably will be an extension of the discharge plate 36 and is disposed with relation to the conveying element so as to engage the ends of the arms 42 of the flights as they pass thereby The stripper plate is provided with an opening 40 to permit the double sprocket 20 to pass therethrough. The upper or forward end of the plate is curved as at 44 so that in operation, the conveying element is guided away from the driving element and downwardly into the return run of the conveyer.

Referring now to Figs. 3 and 4, a modified form of the present invention, as illustrated, may comprise an integral member 50 which serves the purpose of both cleaning out the material between the double sprocket 20 and disengaging the conveying element 12 from the sprocket. The member 50 is supported upon an extension of the discharge plate 36 and is arranged to extend upwardly into the space 30 between the double sprocket 20. The outer edge 52 of the member 50 is disposed with relation to the conveying element so as to engage hubs 18 of the flights during the rotation of the driving element and thus disengage the conveying element and the sprocket and guide it downwardly into the return run of the conveyer.

From the description thus far, it will be observed that the construction of the present conveyer is particularly adapted for maintaining the driving element free and unobstructed particularly during the conveyance of materials which have a tendency to adhere to the driving sprocket, and also to prevent the conveying element from being carried beyond the normal point of disengagement with the rotary driving element. Experience has shown that in some instances in the prior art conveyers the accumulation of material upon the sprocket and particularly between the teeth of the sprocket has had the effect of changing the pitch to such an extent as to offer serious difficulties in the operation of the conveyer. This difficulty has been entirely eliminated in the present invention.

While the preferred embodiment of the invention has been herein illustrated and described, it will be understood that the invention may be embodied in other forms within the scope of the following claims.

Having thus described the invention, what is claimed is:

1. In a conveyer of the character described in combination, a substantially upright casing, a conveying element traversible therethrough, a rotary driving member mounted at the upper end of the casing and over which the conveying element passes, said rotary driving member comprising a double sprocket having its inner faces spaced apart and its peripheral portions arranged to cooperate with opposed portions of the conveying element during the passage of the latter thereover, a discharge outlet including a plate disposed in the casing below said double sprocket, and a stationary member secured to the casing and extending between the inner faces of said double sprocket to dislodge material adhering to said inner faces, said stationary member having a portion thereof engageable with said conveying element to cause disengagement of said conveying element from said sprocket at a predetermined point during the rotation of said sprocket.

2. In a conveyer of the character described, in combination, a casing, a conveying element traversible therethrough, a rotary member over which the conveying element passes, said conveying element including a plurality of spaced flights of open structures extending laterally outwardly of said rotary member, said rotary member mounted at the upper end of the casing and comprising a double sprocket having its inner faces spaced apart and its peripheral portions arranged to cooperate with opposed portions of the conveying element during the passage of the latter thereover, and a stationary member secured to the casing and extending between the inner faces of said double sprocket to dislodge material adhering to said inner faces, the said stationary member being engageable with said conveying element to cause disengagement of said conveying element from said sprocket at a predetermined point during the rotation of said double sprocket whereby to prevent said conveying element from adhering to said double sprocket and excessively rotating therewith.

3. In a conveyer of the character described, the combination of a casing, a conveying element traversible therethrough, a rotary driving member mounted at the upper end of the casing and over which the conveying element passes, said conveying element including a plurality of spaced flights each including a generally U-shaped portion the legs of which are adapted to straddle said rotary driving member, and a stationary member mounted adjacent said rotary driving member so that it is disposed intermediate said legs and is engageable with said conveying element to cause disengagement of said conveying element from said rotary driving member at a predetermined point during the rotation of said rotary driving member whereby to prevent said conveying element from adhering to said rotary driving member and rotating excessively therewith.

4. In a conveyer of the character described, the combination of: a casing, a conveying element traversible through said casing and comprising a plurality of connected flight members each having a hub portion, a rotary member over which said conveying element extends, said rotary member comprising a double sprocket, said double sprocket having inner faces spaced apart axially and peripheral portions arranged to engage with said hub portions, and a stationary member adjacent said double sprocket including a portion extending between said faces to dislodge material adhering to said faces, said stationary member also having another portion arranged to engage said hub portions to cause disengagement of said flight members from said double sprocket at a predetermined point during the rotation of said double sprocket, whereby to prevent material from building up between said faces of said double sprocket and to prevent said flights from adhering to said double sprocket and rotating excessively therewith.

ALFRED DELOS SINDEN.